US006882899B2

(12) United States Patent
Baldwin et al.

(10) Patent No.: US 6,882,899 B2
(45) Date of Patent: Apr. 19, 2005

(54) SENSING HEAD POSITIONING SYSTEM USING TWO-STAGE OFFSET AIR BEARINGS

(75) Inventors: David L. Baldwin, San Jose, CA (US); Alexander J. Nagy, Santa Cruz, CA (US); Jeffrey A. Hawthorne, San Francisco, CA (US); Jeffrey P. Sample, Milpitas, CA (US); Thanh V. Dang, San Jose, CA (US)

(73) Assignee: Photon Dynamics, Inc., San Jose, CA (US)

( * ) Notice: Subject to any disclaimer, the term of this patent is extended or adjusted under 35 U.S.C. 154(b) by 738 days.

(21) Appl. No.: 09/858,305

(22) Filed: May 15, 2001

(65) Prior Publication Data

US 2002/0059014 A1 May 16, 2002

Related U.S. Application Data

(60) Provisional application No. 60/204,918, filed on May 16, 2000.

(51) Int. Cl.[7] .............................................. G06F 19/00
(52) U.S. Cl. .......................... 700/192; 700/60; 700/302
(58) Field of Search ................................ 700/178, 186, 700/192, 193, 195, 302, 60–63, 66, 114, 59

(56) References Cited

U.S. PATENT DOCUMENTS 4,818,838 A * 4/1989 Young et al. .......... 219/121.12
4,884,697 A * 12/1989 Takacs et al. ............... 356/516
5,615,039 A 3/1997 Henley ....................... 359/257
5,898,179 A * 4/1999 Smick et al. .......... 250/492.21
6,151,153 A 11/2000 Bryan ........................ 359/245
6,211,991 B1 4/2001 Bryan ........................ 359/254
6,220,080 B1 * 4/2001 Fauque ....................... 324/662
6,285,102 B1 * 9/2001 Matsuoka et al. ............ 310/90
6,545,500 B1 * 4/2003 Field .......................... 324/770

* cited by examiner

*Primary Examiner*—Leo Picard
*Assistant Examiner*—Chad Rapp
(74) *Attorney, Agent, or Firm*—Townsend and Townsend and Crew LLP

(57) ABSTRACT

Methods, apparatuses, and systems are presented for positioning a sensing head relative to a workpiece, involving a control unit operative to provide a plurality of control signals to iteratively control positioning of the sensing head relative to the workpiece, a plurality of air injectors disposed and fixedly connected on a periphery of the sensing head, each of the air injectors capable of being independently controlled to eject a gas between the sensing head and the workpiece to create an air bearing and affect positioning of the sensing head relative to the workpiece in response to at least one of the control signals, and a plurality of sensors providing a plurality of feedback signals to the control unit, the feedback signals containing information relating to positioning of an optical imaging sensing head relative to the workpiece.

27 Claims, 8 Drawing Sheets

SENSING HEAD POSITIONING SYSTEM USING TWO-STAGE OFFSET AIR BEARINGS

BACKGROUND OF THE INVENTION

This invention relates to test equipment and in particular to a system for testing using noncontact electro-optical imaging of a flat panel device such as a liquid crystal display.

Diagnostic sensor placement requirements are extremely high. A flat sensor plate that is part of a sensing head which measures approximately 8 cm on each side must be placed parallel within 3 um of a flat workpiece, such as an LCD glass panel. The gap distance between the workpiece panel and sensor plate needs to be a selectable value between 7 um and 30 um and preferably between 10 um and 25 um with a tolerance of +/−0.5 um. Component hardware used to position the sensing head cannot encroach upon the clear 8 cm square aperture of the sensing head because the sensing head produces information that is read by an optical array (a CCD camera) focused on the clear aperture.

The sensing head must be able to maintain the required gap position without contacting the glass panel even when added attracting electrostatic forces resulting from a high voltage applied between the sensor plate of the sensing head and panel are present.

The sensing head must be quickly separable from the panel surface to a gap of greater than 75 um to permit translation of the elements without contact between the panel and the sensor plate as the sensing head is moved over the panel to another site. Once the sensing head arrives at the new site, the gap must be quickly reduced to the low gap position to allow the sensing head to acquire data.

Sensor placement above the panel must compensate for the variation of panel surface height from the sensor datum.

SUMMARY OF THE INVENTION

The invention presents methods, apparatuses, and systems for positioning a sensing head relative to a workpiece, involving a control unit operative to provide a plurality of control signals to iteratively control positioning of the sensing head relative to the workpiece, a plurality of air injectors disposed and fixedly connected on a periphery of the sensing head, each of the air injectors capable of being independently controlled to eject a gas between the sensing head and the workpiece to create an air bearing and affect positioning of the sensing head relative to the workpiece in response to at least one of the control signals, and a plurality of sensors providing a plurality of feedback signals to the control unit, the feedback signals containing information relating to positioning of an optical imaging sensing head relative to the workpiece.

In one embodiment, a system is provided wherein a plurality of high accuracy air injectors are disposed along the edges of a sensor plate of a sensing head to form an air bearing and a plurality of high displacement air injectors are also disposed along the edges of the sensor plate to form an air bearing, each independently controlled, with the sensing head having sensors coupled in a feedback loop through a mapper which iteratively adjusts relative separation of the sensor plate and a flat panel workpiece to the desired positional accuracy through digital to analog converters supplying control signals to analog amplifiers controlling orifices. Translation is effected after the high displacement air injectors are activated, with the combination of flow of air from the air bearing outlets along the edge of the sensor plate and the translation in x and y of the flat panel being operative to air brush sweep the surface of the flat panel.

Translation of the LCD glass panel is effected after the high displacement air injectors are activated, with the combination of flow of air from the air injector outlets along the edge of the sensor plate and the translation in x and y of the flat panel being operative to air brush sweep the surface of the flat panel.

The placement of the air injectors to the side of the sensing head is important. Air leakage path between the surface of the air injector and the surface of the sensor plate is to be minimized. A means is provided for sealing the air leakage path between the air injector and the corner radius of the sensor plate edge.

In addition, edge placement of the of the injectors fulfills the requirement of sweeping the particulates out of the path of the advancing sensor, thus reducing or eliminating sensing head and panel abrasion damage.

The invention will be better understood by reference to the following detailed description in connection with the accompanying drawings.

DESCRIPTION OF EMBODIMENTS

Figure 1:
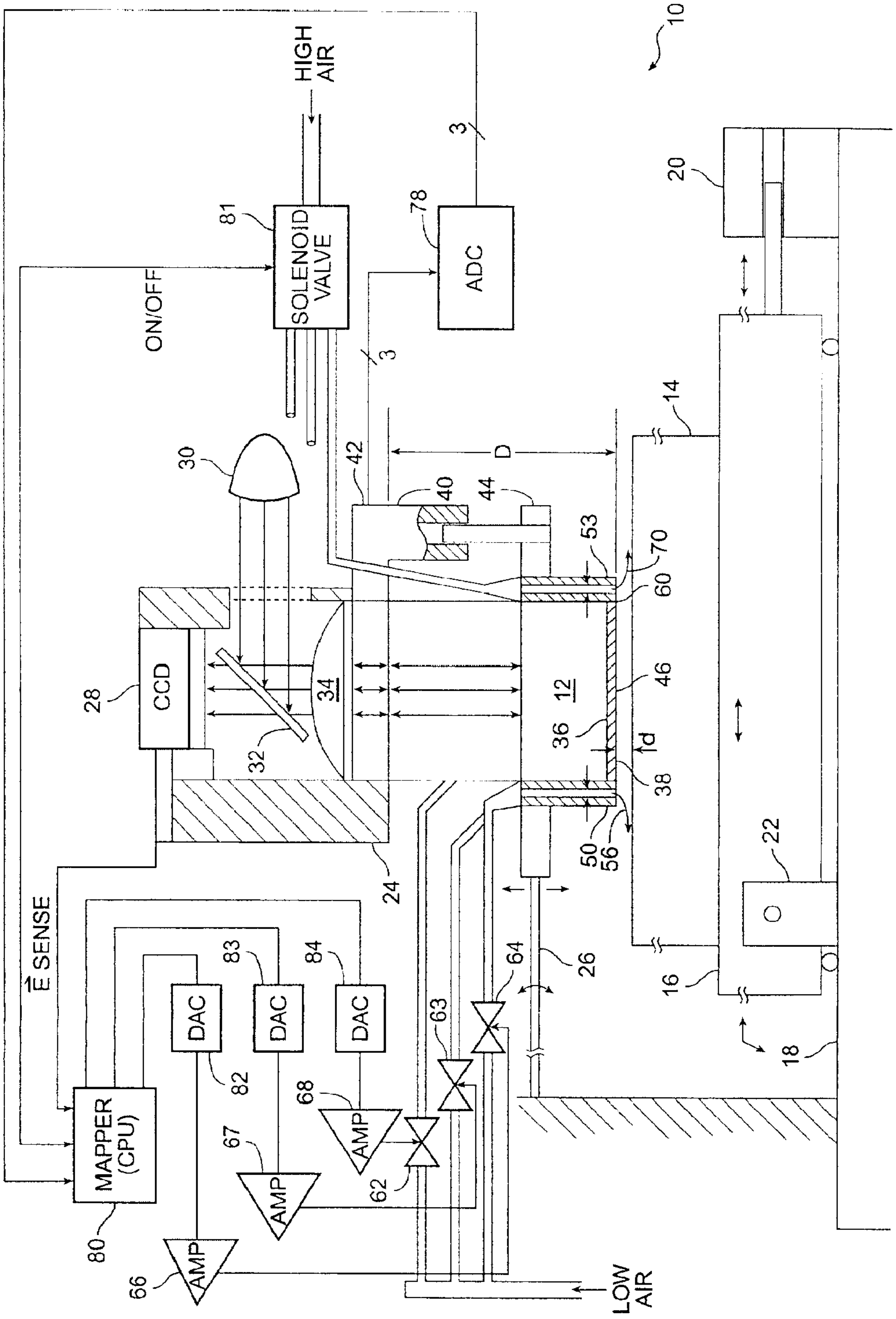
FIG. 1 is a block diagram of the system according to the invention.
Figure 2:
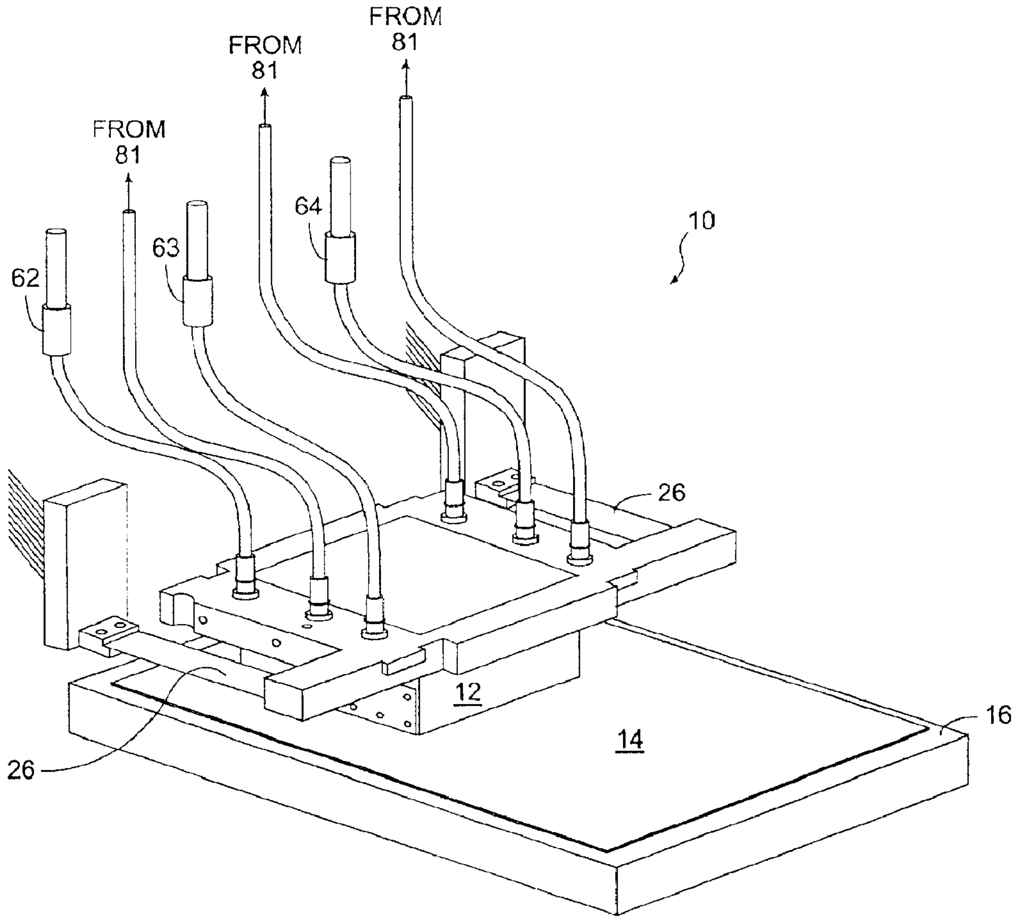
FIG. 2 is a perspective view of the top of a sensing head according to the invention.

Referring to FIGS. 1, 2, 3 and 4, a system 10 according to the invention with a sensing head 12 is positioned in x, y and z relative to a flat panel workpiece 14 mounted on a translation platform 16 of a table 18. The translation platform is movable in x and y by positioning stepper motors 20, 22. The sensing head 12 is suspended between an optical head 24 and the workpiece 14 on a cantilever spring 26 and is movable along the z direction (up and down relative to the workpiece) and in rotation about the x-axis and the y-axis (in the plane of a sensor plate 38 of the sensing head 12). However the sensing head 12 cannot translate along the x-axis (transverse to the cantilever spring 26) and can move only slightly along the y-axis with rotation about the x-axis at the base of the cantilever spring 26 and cannot rotate about the z-axis. The tolerances are extremely tight since the resolution of motion is comparable to within a few orders of magnitude of the wavelength of light.

The optical head 24 senses illumination through a CCD array 28 reflecting illumination from a light source 30 redirected through a partially reflective mirror 32. An optical imaging surface 36 of the sensor plate 38 of the sensing head 12 is translatable relative to optics 34 to focus reflected light onto the CCD array 28.

Figure 6A:
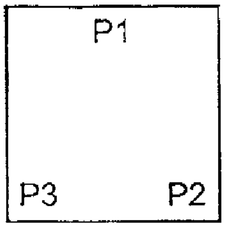
FIGS. 6A–6D are schematic diagrams of the air injector positions, coordinates of image statistics sensing regions, virtual sensor positions, and LVDT sensor positions.
Figure 6B:
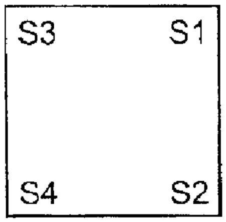
Figure 6C:
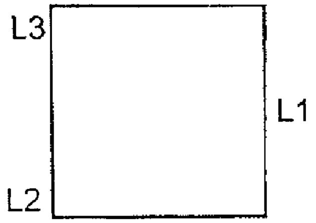
Figure 6D:
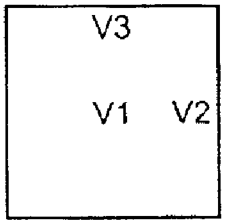

From (three) positions (L1, L2, L3, FIG. 6C) a set of corresponding (three) linear voltage displacement translators (LVDT) 40 sense the distance D (FIG. 1) between a point on the housing 42 of the optical head 24 and a point on the sensing head housing 44 and thus provides a measure of the distance between the CCD array 28 and the optical imaging surface 36.

Imaging statistics at selected positions (S1, S2, S3, S4, FIG. 6B) in the sensed image extracted from the reflected light of surface 36 yield readings of intensity, which can be translated into a small displacement distance d (FIG. 1) between the workpiece 14 and the voltage sensing surface 46 of the sensor plate 38. (The conversion of voltage to an optically sensible image is a modulation, so the sensing head is also often called a modulator.)

Spacing of the sensor plate 38 from the workpiece 14 is controlled by two different types of air injectors 50–52 and 53–55, all mounted on the sensing head 12 along the side edges of the sensor plate 38. A high accuracy, close positioning air injector set 50–52 comprises a plurality of first injector outlets 56–58 along the plate edge 60 whose single orifices 62–64 per outlet are controlled closely by amplifiers 66–68. The orifices are choke flow valves wherein the pressure differential Pout/Pin is <0.5 so that linear voltage change converts to a nearly linear air flow change. A high displacement air injector set 53–55 comprises a plurality of second injector outlets 70–72 along the plate edge 60 whose air source is via a solenoid valve 81 switching air to the second injector outlets 70–72 substantially simultaneously to lift the sensor plate 38 to be clear of any obstructions.

The valve orifices 62–64 have a diameter of about 100–250 um and the outlets 56–58 have a diameter of about 750 um. The high flow outlets have a diameter of about 750 um.

Figure 3:
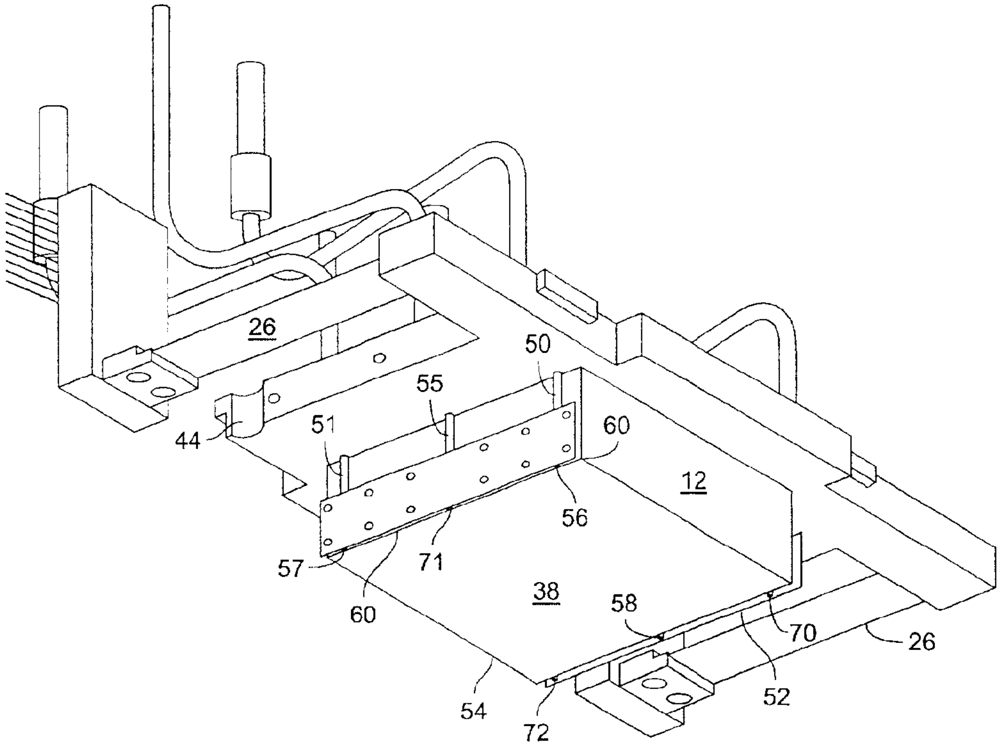
FIG. 3 is a perspective view of the face of the sensing head according to the invention.

The sensing head 12 utilizes edge-fed air injectors, such as air injectors 53–55, as contrasted to the center-fed air injectors of prior known air bearing designs. The spacing of the gap is sufficiently close that air serves as an adequate damper to prevent inertial oscillation of the sensing head when position is changed. One configuration is shown in FIG. 3. Air injected at opposing edge locations into the gap between the sensor plate surface and panel workpiece 14 maintains the correct gap between the sensor plate 38 and panel workpiece 14 according to the required tolerances (~1 um to 30 um +/−0.5 um). Control of this gap of distance d is achieved by controlling the volume of air flow into the sensor plate/panel workpiece interface at opposing edges where three injector outlets 56, 57, 58 are flush mounted to the sensing head 12 with the face of the outlets being substantially exactly at the same height as the sensor plate 38. The amount of air flow to each injector is determined by information (image data related to luminosity) from image statistic sensors (S1, S2, S3, S4, FIG. 6B) in the floating sensing head 12 and/or typically three LVDT sensors 40 mounted at three peripheral positions (L1, L2, L3, FIG. 6C) to measure separation of the optical head from the sensing head. An analog signal to digital converter set 78 (three) provides readings in a feedback loop through a mapper (a programmable CPU) 80. Other feedback signals from the CCD array 28 provide image statistics to the mapper 80. The mapper 80, without knowledge of the exact positions of the image statistics sensors or of the air injectors, but being responsive to the feedback information, iteratively adjusts relative separation of the sensor plate 38 and a flat panel workpiece 14 to the desired positional accuracy through (three) digital to analog converters 82–84 supplying control signal amplifiers 66–68 controlling orifices 62–64. Precise location of image statistics sensors and air injectors is not critical, as will be explained. Gap indexing is reliably achieved by increasing the amount of air metered into the sensor plate/panel interface using the high flow outlets. The increased air volume causes the sensing head to quickly hop to a gap of greater than 75 um above the panel. The high volume air is applied through the separate set of high flow outlets to the air injector-sensing head interface. This eliminates the requirement for reacquiring the low flow air setting at the next site.

The sensor plate height d is automatically regulated to the correct position above the panel by software of the mapper 80 controlling the volume of air injected into the air injector orifices. Irregularities of workpiece panel surfaces are accounted for by adjusting the airflow though each edge-mounted air injector as required to maintain the needed gap. Lateral movement of the sensor plate 38 over the panel 14 surface is inhibited via the cantilever suspension system where each or a pair of parallel leaf springs 26 is wide compared to thickness so that there is high stiffness in the x and y directions parallel to the sensor plate 38 and thus the panel 14. Other restraint systems are possible.

It is important to note that the desired gap is thus achieved for a wide variety of sensor plate orientations and surface profiles.

Figure 4:
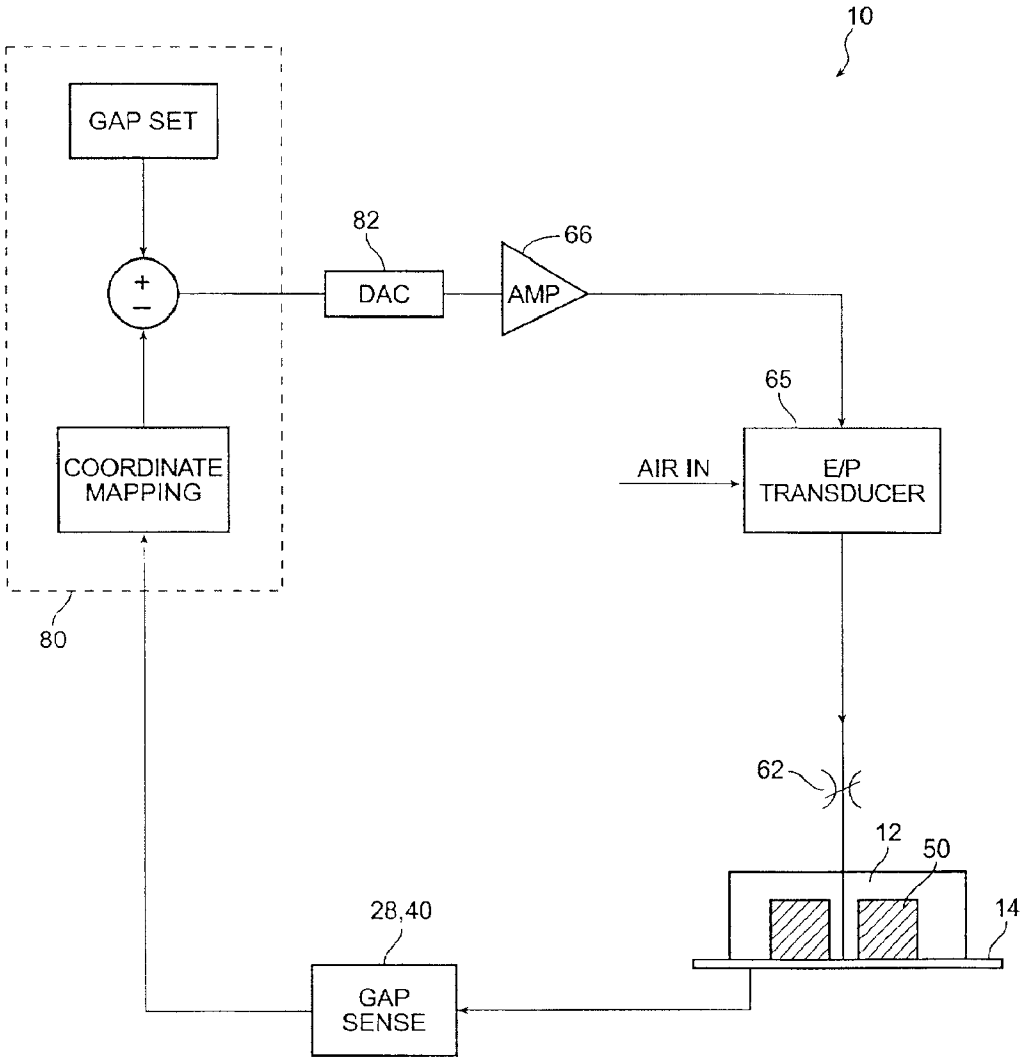
FIG. 4 a schematic block diagram of a single transducer and air injector circuit with feedback control.

FIG. 4 a schematic block diagram of a single transducer and air injector circuit with feedback control. Mapper 80 sends a digital control signal to digital to analog converter 82, which sends an analog control signal to E/P transducer 65, which could be incorporated into valve orifice 62 but is shown here as a separate block controlling valve orifice 62. Air flowing from valve orifice 62 is fed to air injector 50, which is attached to sensing head 12. The position of sensing head 12 relative to workpiece 14 is sensed by CCD array 28 and LVDT sensor 40, represented here as one functional block which forwards position information signals to mapper 80.

Figure 5:
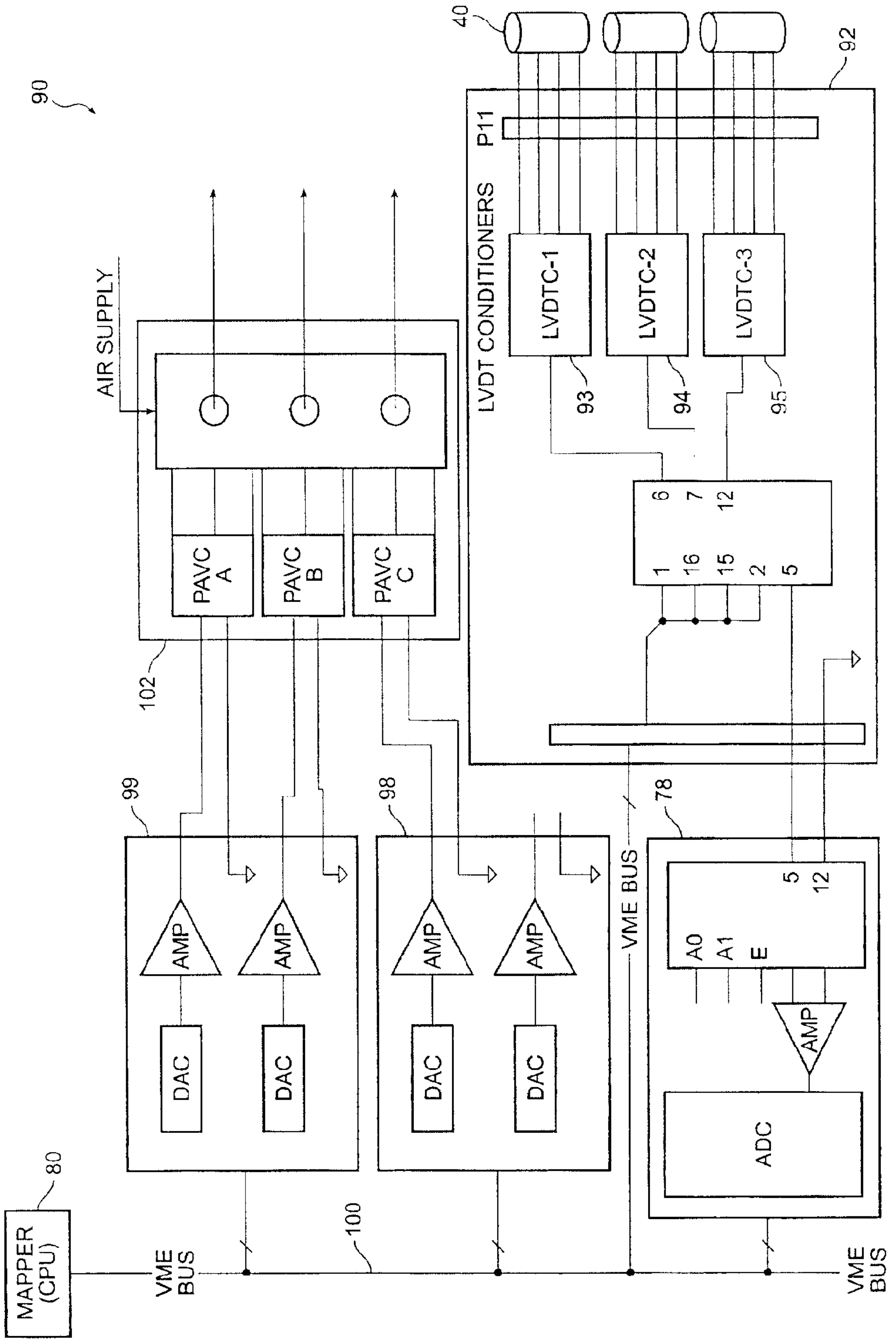
FIG. 5 is a block diagram of a specific embodiment of an electronic modules in a system according to the invention coupled to sensors, loads and a computer system (not shown).

FIG. 5 is a block diagram of a specific embodiment of electronic modules 90 in a system 10 according to the invention coupled to sensors, loads and a computer system (not shown). Shown is a conditioning subsystem 92 connected with LVDT(s) 40. The LVDT(s) 40 may send measurement signals to the conditioning system 92. The conditioning system 92 may send conditioned measurement signals to a digitizer system 78, which transforms the conditioned measurement signals to digitized conditioned measurement signals using an analog signal to digital converter set. DAC/amplifiers 98, 99 drive proportional air valve controller (PAVC) 102, which adjusts air valves 66–68 (not shown) associated with air tubes connected to the sensing head housing 44. Air supply at about twice the highest expected pressure of the output is supplied to the adjustable valves.

In the CPU, the software provides the functions of gathering image statistics from the N image statistic sensors (typically 4) S1, S2, S3, S4, which are transformed to measure the three dimensions of movement z, θx and θy (a.k.a. virtual sensors V1, V2, V3), which is then used to adjusted the control air flow of the high accuracy, close positioning air injectors P1, P2, P3.

In a specific embodiment of three high accuracy, close positioning air injectors disposed at positions P1, P2, P3

(FIG. 6A) around the sensing head, the sensing head position is controlled by adjusting the three high accuracy, close positioning air injector settings via feedback from N image statistics sensor values. Subsequent transformations are applied to these image statistics sensor values to yield three virtual sensor values. The virtual sensor value units are microns and are comparable to the (interpolated) LVDT sensor values. The virtual sensor space may also viewed as:

(height, rotation about x-axis, rotation about y-axis).

Hence, the mapping of R^3 to R^n (pressure space to image statistics sensor space) is transformed into a differentiable, non-singular map from R^3 to R^3 (pressure space to virtual sensor space).

When the differential image statistics sensor values are out of tolerance, the low flow air injector settings are iteratively adjusted using a variation of Newton's method, specifically:

1) Calculate a close approximation of the derivative of the map by individually varying each low pressure setting by a small amount and measuring the virtual sensor values. This yields a 3×3 matrix.
2) Apply the inverse of this 3×3 matrix to the virtual sensor (vector) differential value (delta), which yields a pressure (vector) differential value (delta).
3) Adjust the current pressure settings by this pressure differential.
4) Repeat steps 1 through 3 until the virtual sensor values are within the desired tolerance.

It has been found that this procedure has several advantages over known techniques for sensing an output for feedback:

1) It is based on a simple intuitive mathematical model.
2) The map is differentiable and non-singular so its derivative may be represented by a 3×3 invertible matrix.
3) There is much less dependence on actual geometry. As a consequence, it is almost irrelevant as to where the air injectors are located (e.g., it does not matter that air injectors are symmetric only on y-axis), and there is great flexibility on number and location of the image statistics sensor values (which here requires four or more "symmetrically balanced" samples from the image).
4) The virtual sensor space and the LVDT space are in the same units (microns) and hence are comparable.
5) No pre-calibration is required. (The option is nevertheless available to use previously collected derivative data in order to more quickly make small adjustments as required).

The LVDT sensors are a common type of position sensor. The primary purpose of the LVDT sensors is to define and reproduce a defined focus position (the center of the depth of field of the camera optics). However, they are also used in the following contexts:

1) As a backup sensor system and to increase the efficiency of the auto-gapping algorithm, namely the sensing head to panel gap positioning algorithm.
2) To detect positional anomalies and to do safety limit checks during an inspection.
3) To characterize the mechanical response of the various components of the sensing head, air injectors, controlling orifices, etc.
4) System diagnostics and calibration (e.g. the amount of time it takes for the sensing head to settle after the high flow injectors are turned off. This determines when it's ok to start image acquisition at each site)
5) To obtain fine grained positional data; which is information for algorithm development and tuning.

Notation used in FIGS. 6A–6D is as follows:

p~pressure(s)

s~image statistics sensor values v~virtual sensor values (~microns; at fixed offset from LVDT values)

1~LVDT values

S~map from pressure space to image statistics sensor space

V~map from image statistics sensor space to virtual sensor space

V(S( ))~composite map from pressure space to virtual sensor space

D(V(S( )))~the first derivative of this composite map

D(V(S( ))): (dp1, dp2, dp3)→(dv1, dv2, dv3)

Several mappings are obtained, as indicated schematically:

S( ) V( )

(p1, p2, p3) |----→ (s1, s2, ..., sn) |----→ (v1, v2, v3)

[pressure space] [image statistics sensor space] [virtual sensor space]

L(z)

(p1, p2, p3) |---→ (11, 12, 13)

[pressure space] [LVDT space]

S( ):=Implicitly defined function; where the pressure settings indirectly determine image statistics sensor values.

Mapping is according to the following equations, using the referenced notation:

V( ):=(s1, s2, s3, s4)→(s1', s2', s3', s4')

((s1'+s2'+s3'+s4')/4, (s1'+s2'−s3'−s4')

~(z, dZx, dZy)

→(z, z+dzx, z+dzy)

:=(v1, v2, v3)

This assumes exactly four sensor regions.

The first transformation (si→si') yields micron units.

The resulting (v1, v2, v3) virtual sensors are in micron units which are at a fixed (vector) offset from the LVDT sensors.

L(z):=Map from the low pressure space to adjusted LVDT space (depends on Z-stage position).

It is important that the face of the sensing head structure of the edge of the sensing head 12 be flush.

Figure 7:
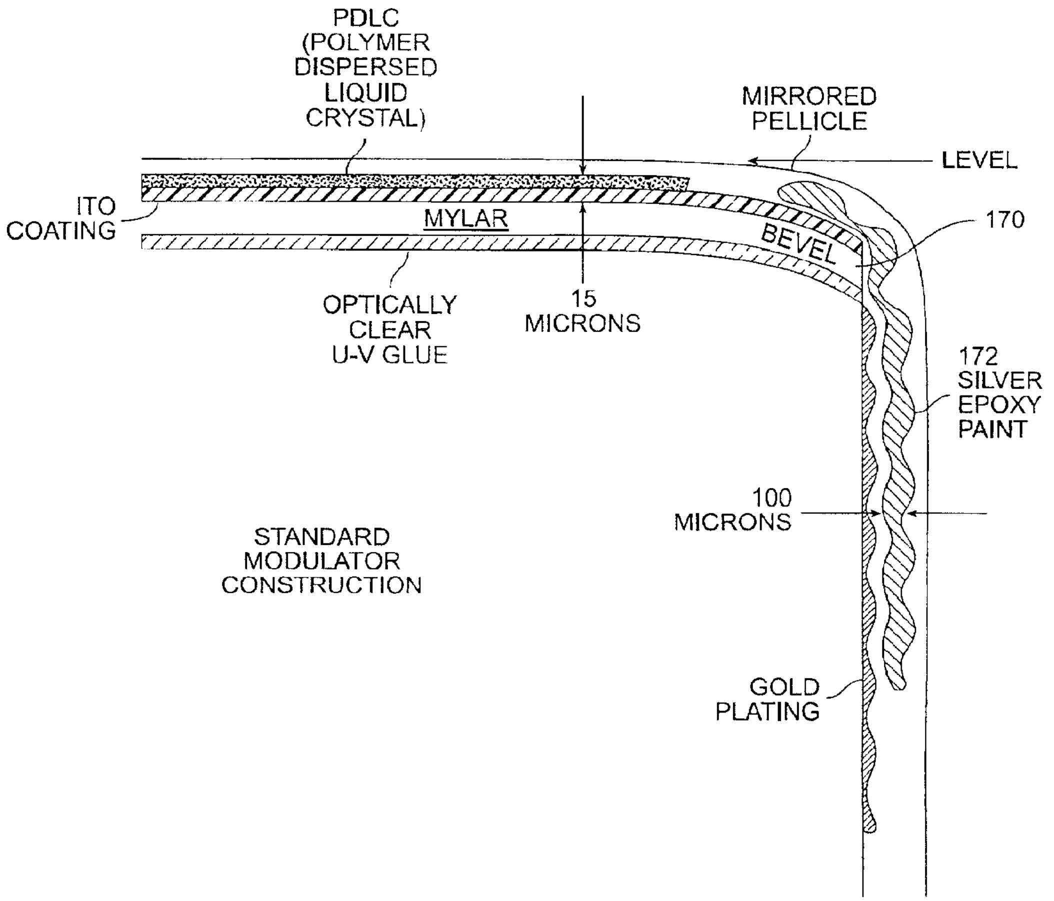
FIG. 7 (PRIOR ART)
FIG. 7 is a cross section of a corner of a prior art sensing head structure.
Figure 8:
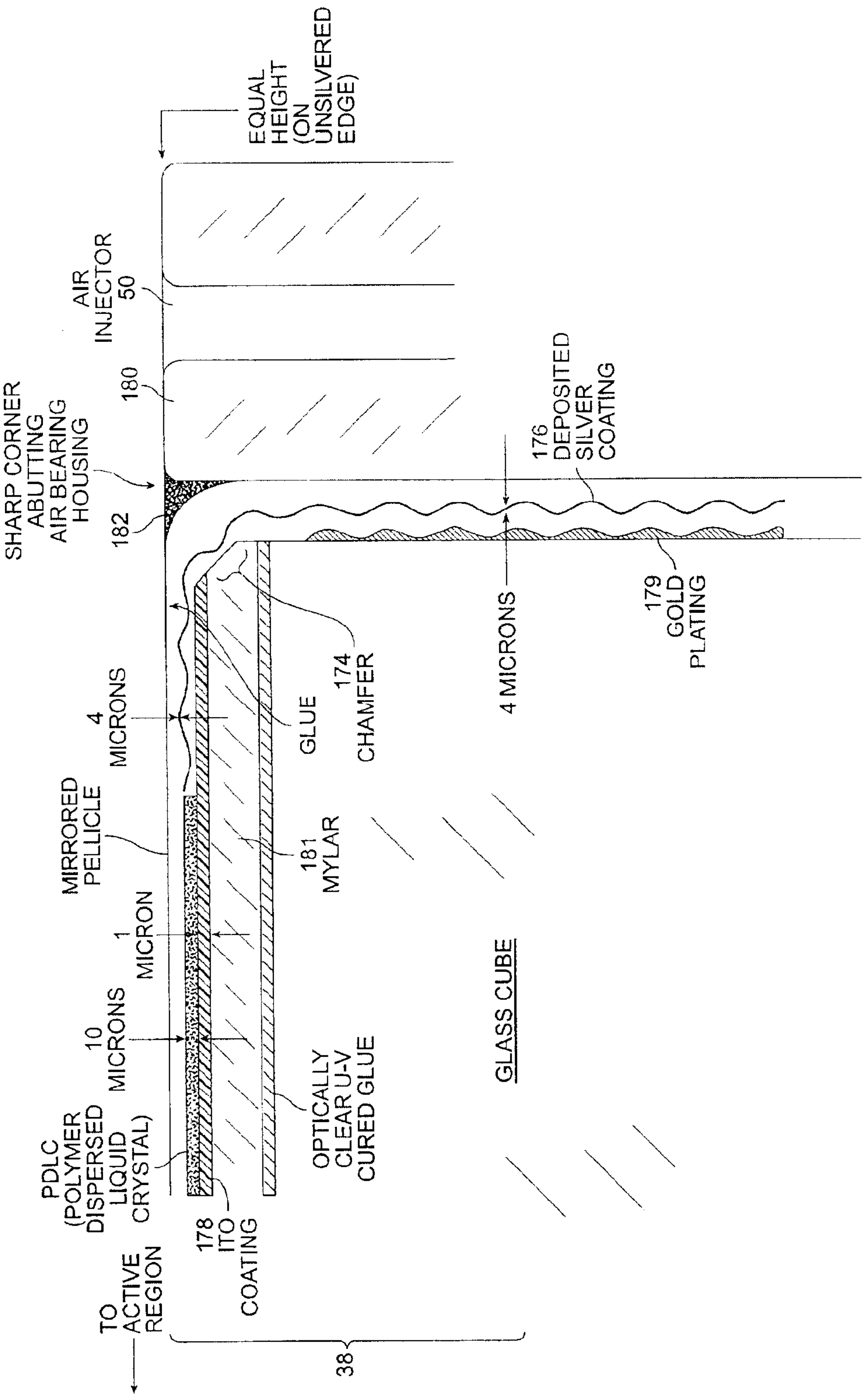
FIG. 8 (PRIOR ART)
FIG. 8 is a cross section of a corner of a sensing head and air injector structure according to the invention.

Referring to FIG. 7, the prior art beveled edge 170 is shown with a silver epoxy paint 172 of uncontrolled large thickness. Referring to FIG. 8, the placement of the air injectors 50–55 to the side of the sensing head 12 is important. Air leakage path between the surface of the air injector (50–52) and the surface of the sensor plate 38 is to be minimized. In FIG. 8, the bevel is omitted in favor of a small chamfer 174 over which a silver coating 176 is deposited between the ITO coating 178 and the gold plating 179 of the contact. The air injectors 50–52 are flush (along an orthogonal edge) with the sensor plate 38. The silver coating is less than the thickness of the polymer dispersed liquid crystal (pdlc) forming the sensor plate 38 and binds to the ITO coating 178 on the Mylar(r) polyurethane substrate 181. The means provided for sealing the air leakage path between the air injector 50 and the coatings on the small chamfer 174 of the sensor plate 38 edge is an appropriate dielectric casting material 182 filling the void.

The invention has been explained with reference to specific embodiments. Other embodiments will be evident to those of ordinary skill in the art. It is therefore not intended that this invention be limited, except as indicated by the appended claims.

What is claimed is:

1. An apparatus for positioning a sensing head relative to a workpiece, the apparatus comprising:

a control unit operative to provide a plurality of control signals to iteratively control positioning of the sensing head relative to the workpiece;

a plurality of air injectors disposed and fixedly connected on a periphery of the sensing head, each of the air injectors capable of being independently controlled to eject a gas between the sensing head and the workpiece to create an air bearing and affect positioning of the sensing head relative to the workpiece in response to at least one of the control signals; and a plurality of sensors capable of providing a plurality of feedback signals to the control unit, the feedback signals containing information relating to positioning of an optical imaging sensing head relative to the workpiece.

2. The apparatus of claim 1 further comprising:

a support member connected with the sensing head, the support member substantially restricting movement of the sensing head to (a) translational movement along a z-axis, (b) rotational movement about an x-axis normal to the z-axis, and (c) rotational movement about a y-axis normal to the z-axis.

3. An apparatus for positioning a sensing head relative to a workpiece, the apparatus comprising:

a control unit operative to provide a plurality of control signals to iteratively control positioning of the sensing head relative to the workpiece;

a plurality of air injectors disposed and fixedly connected on a periphery of the sensing head, the air injectors capable of ejecting a gas between the sensing head and the workpiece to create an air bearing and affect positioning of the sensing head relative to the workpiece in response to at least one of the control signals;

a plurality of sensors capable of providing a plurality of feedback signals to the control unit, the feedback signals containing information relating to positioning of an optical imaging sensing head relative to the workpiece; and wherein the control unit is further operative to map readings received from the sensors from a sensor-space representation to a virtual-sensor-space representation before forming an output-to-movement relationship such that an inverse of an output-to-movement relationship is more likely to be obtainable.

4. An apparatus for positioning a sensing head relative to a workpiece, the apparatus comprising:

a plurality of first air injectors fixedly connected with the sensing head;

a plurality of second air injectors fixedly connected with the sensing head;

a plurality of sensors providing a plurality of feedback signals, the feedback signals containing information relating to positioning of the sensing head relative to the workpiece; and a control unit receiving the plurality of feedback signals from the sensors and controlling the first and second air injectors, the control unit capable of bringing positioning of the sensing head relative to the workpiece within a desired range by iteratively adjusting the first air injectors, the control unit being capable of adding an additional separation distance to positioning of the sensing head relative to the workpiece by operating the second air injectors.

5. An apparatus for positioning a sensing head relative to a workpiece, the apparatus comprising:

a plurality of sensors operative to detect a reading of positioning of the sensing head relative to the workpiece;

a plurality of air injectors fixedly connected with the sensing head, each of the air injectors capable of ejecting a gas with a variably controllable output level between the sensing head and the workpiece in order to affect positioning of the sensing head relative to the workpiece; and a control unit operative to receive the reading from the sensors and to control the air injectors, the control unit being capable of locating the sensing head relative to the workpiece within a desired range, said locating comprising:

(a) varying the output level of each air injector by a small amount and noting a resulting change in the reading received from the sensors in order to form an output-to-movement relationship;

(b) applying an inverse of the output-to-movement relationship to the reading received from the sensors in order to calculate a plurality of output adjustments;

(c) adjusting the output levels of the air injectors by the output adjustments; and (d) repeating (a) through (c) until positioning of the sensing head relative to the workpiece is within the desired range.

6. The apparatus of claim 5, wherein the control unit is further operative to map the reading received from the sensors from a sensor-space representation to a virtual-sensor-space representation before forming the output-to-movement relationship such that the inverse of the output-to-movement relationship is more likely to be obtainable.

7. The apparatus of claim 5 further comprising:

a support member connected with the sensing head, the support member substantially restricting movement of the sensing head to (a) translational movement along a z-axis, (b) rotational movement about an x-axis normal to the z-axis, and (c) rotational movement about a y-axis normal to the z-axis.

8. The apparatus of claim 7, wherein the support member is a cantilever spring.

9. The apparatus of claim 5, wherein the gas that is ejected between the sensing head and the workpiece is air.

10. The apparatus of claim 5, wherein the air injectors are fixedly connected with the sensing head at asymmetrical locations juxtaposed to the sensing head.

11. The apparatus of claim 5, wherein the air injectors are fixedly connected with the sensing head at locations juxtaposed to a perimeter portion of the sensing head.

12. The apparatus of claim 5, further comprising a plurality of additional air injectors fixedly connected with the sensing head, the additional air injectors capable of ejecting gas between the sensing head and the workpiece in order to add an additional separation distance to positioning of the sensing head relative to the workpiece.

13. The apparatus of claim 5, wherein a filler material is disposed as a seal between the sensing head and the air injectors to eliminate air leakage paths between the sensing head and the air injectors.

14. A method for positioning a sensing head relative to a workpiece, the method comprising the steps of:

detecting, using a plurality of sensors, a reading of positioning of the sensing head relative to the workpiece;

ejecting from a plurality of air injectors fixedly connected with the sensing head a gas between the sensing head and the workpiece in order to affect positioning of the sensing head relative to the workpiece; and locating the sensing head relative to the workpiece within a desired range, said locating comprising:

(a) varying an output level of each air injector by a small amount and noting a resulting change in the reading received from the sensors in order to form an output-to-movement relationship;

(b) applying an inverse of the output-to-movement relationship to the reading received from the sensors in order to calculate a plurality of output adjustments;

(c) adjusting the output levels of the air injectors by the output adjustments; and (d) repeating (a) through (c) until positioning of the sensing head relative to the workpiece is within the desired range.

15. The method of claim 14, further comprising the step of mapping the reading received from the sensors from a sensor-space representation to a virtual-sensor-space representation before forming the output-to-movement relationship such that the inverse of the output-to-movement relationship is more likely to be obtainable.

16. The method of claim 14, further comprising the step of substantially restricting movement of the sensing head to (a) translational movement along a z-axis, (b) rotational movement about an x-axis normal to the z-axis, and (c) rotational movement about a y-axis normal to the z-axis.

17. The method of claim 14, wherein the gas that is ejected between the sensing head and the workpiece is air.

18. The method of claim 14, wherein the air injectors are fixedly connected with the sensing head at asymmetrical locations juxtaposed to the sensing head.

19. The method of claim 14, wherein the air injectors are fixedly connected with the sensing head at locations juxtaposed to a perimeter portion of the sensing head.

20. The method of claim 14, further comprising the step of ejecting from a plurality of additional air injectors fixedly connected with the sensing head gas between the sensing head and the workpiece in order to add an additional separation distance to positioning of the sensing head relative to the workpiece.

21. A system for positioning a sensing head relative to a workpiece, the system comprising:

means for detecting a reading of positioning of the sensing head relative to the workpiece using a plurality of sensors;

means for ejecting from a plurality of air injectors fixedly connected with the sensing head a gas between the sensing head and the workpiece in order to affect positioning of the sensing head relative to the workpiece; and means for locating the sensing head relative to the workpiece within a desired range, said locating comprising:

(a) varying an output level of each air injector by a small amount and noting a resulting change in the reading received from the sensors in order to form an output-to-movement relationship;

(b) applying an inverse of the output-to-movement relationship to the reading received from the sensors in order to calculate a plurality of output adjustments;

(c) adjusting the output levels of the air injectors by the output adjustments; and (d) repeating (a) through (c) until positioning of the sensing head relative to the workpiece is within the desired range.

22. The system of claim 21, further comprising means for mapping readings received from the sensors from a sensor-space representation to a virtual-sensor-space representation before forming the output-to-movement relationship such that the inverse of the output-to-movement relationship is more likely to be obtainable.

23. The system of claim 21, further comprising means for substantially restricting movement of the sensing head to (a) translational movement along a z-axis, (b) rotational movement about an x-axis normal to the z-axis, and (c) rotational movement about a y-axis normal to the z-axis.

24. The system of claim 21, wherein the gas that is ejected between the sensing head and the workpiece is air.

25. The system of claim 21, wherein the air injectors are fixedly connected with the sensing head at asymmetrical locations juxtaposed to the sensing head.

26. The system of claim 21, wherein the air injectors are fixedly connected with the sensing head at locations juxtaposed to a perimeter portion of the sensing head.

27. The system of claim 21, further comprising:

means for ejecting from a plurality of additional air injectors fixedly connected with the sensing head gas between the sensing head and the workpiece in order to add an additional separation distance to positioning of the sensing head relative to the workpiece.

* * * * *